Aug. 7, 1928.
J. M. H. JACOBS
ENGINE CYLINDER
Filed Dec. 13, 1922
1,679,973
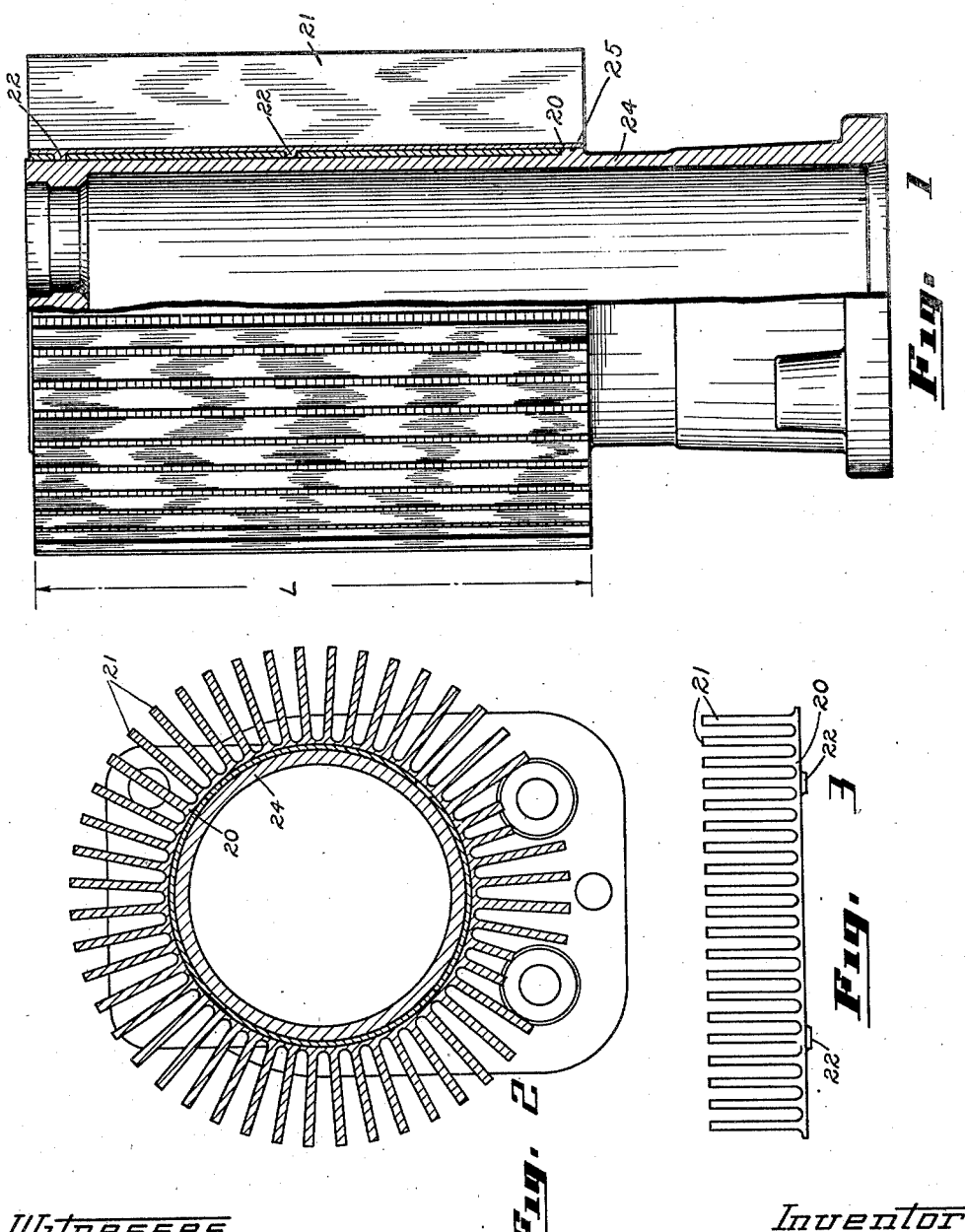

Patented Aug. 7, 1928.

1,679,973

UNITED STATES PATENT OFFICE.

JAMES M. H. JACOBS, OF DAYTON, OHIO, ASSIGNOR TO GENERAL MOTORS RESEARCH CORPORATION, OF DAYTON, OHIO, A CORPORATION OF DELAWARE.

ENGINE CYLINDER.

Application filed December 13, 1922. Serial No. 606,760.

This invention relates to dissipating heat from bodies of relatively low heat conductivity by means of conductive members of relatively high heat conductivity. This invention is particularly useful in connection with cast iron engine cylinders. It is an object of the invention to provide improved means for securing fins of copper or other material of high heat conductivity to a cylinder wall in such a manner as to secure them permanently thereto and permit heat to pass readily from the cylinder wall into the heat conducting fins.

Further objects and advantages of the present invention will be apparent from the following description, reference being had to the accompanying drawings, wherein a preferred form of embodiment of the present invention is clearly shown.

In the drawings:

Fig. 1 is a side view partly in longitudinal section and partly in side elevation showing an engine cylinder constructed in accordance with the present invention;

Fig. 2 is a transverse section of the engine cylinder; and

Fig. 3 is an end view of the finning structure before bending around the cylinder.

Referring to the drawings, the finning material or structure is formed of copper or other metal of high heat conductivity by casting, rolling, or extruding the copper into the form shown in Fig. 3. This form of the material includes a base portion 20 from which extends a plurality of relatively thin fins 21 and suitable spacing lugs 22. The formed material may be made in long strips of a width suitable for a required length of fin when secured to the engine cylinder. In other words the width of this strip may be equal to the length L in Fig. 1. The length of this strip of metal will of course be sufficient to extend around the outer surface of the cast iron cylinder. Such a strip of material will present in section a "comb-like" contour of which the "teeth" are the fins and of which the "back" is comparatively thin and flexible.

The engine cylinder 24 is provided near its lower end with an annular flange or boss 25, the height of which is equal to the height of the lugs 22 upon the finning material base, so that when the base of the fin metal is bent around the cylinder wall it will contact with the ring or flange 25 of the cylinder and the spacing lugs 22 will contact directly with the cylinder wall leaving an annular space between base 20 and the cylinder wall 24.

In securing the fins to the cylinder, the finning material is placed about the cylinder in the manner just indicated and clamped in position in any suitable fashion and while the finning material is held in this position the annular space between the base portion 20 and the outer surface of the cylindrical wall 24 of the cylinder is filled with solder or brazing material having a relatively high melting point, suitable fluxes being used. The flange 25 provides a sealing ring preventing the escape of the brazing material from the bottom of the space between the fin and the cylinder.

In carrying out the pouring operation, the assembled cylinder and fin material should be preheated in any suitable fashion and maintained in a heated condition during the pouring, in order that the solder or brass may not solidify too quickly to allow it to bond with the metals on either side of the annular space. Ordinary solder of 50% tin and 50% lead may be used but brazing metal is preferred. A suitable brazing metal for this purpose is brass having about 60% copper and 40% zinc. Such material may absorb some of the copper of the fin metal but will provide a molecular bond between the iron of the cylinder and the fins. One advantage of the present invention is that the brazing material need not be heated to a relatively high temperature to effect the brazing of the copper to the iron.

While the form of embodiment of the invention as herein shown and described, constitutes a preferred form, it is to be understood that other forms might be adopted, all coming within the scope of the claims which follow.

What I claim is as follows:

1. A finning structure adapted to be secured upon cylinders of internal combustion engines, comprising a strip of metal provided upon one face with a plurality of transverse spacing lugs, and on the other face with cross ribs extending parallel with said lugs, each rib being of considerably greater height than thickness, the strip being sufficiently thin between ribs to be flexible.

2. A finning structure adapted to be secured upon cylinders of internal combustion engines, comprising a strip of metal provided on one face with a plurality of spacing lugs and provided on its other face with cross ribs of considerably greater height than thickness, the strip being sufficiently thin between ribs to be flexible.

3. A finning structure adapted to be secured upon the cylinder of an internal combustion engine comprising a series of plate like portions of metal extending longitudinally of and throughout the part of the cylinder to be cooled, and which portions are arranged alongside one another, and are parallel, one edge of each plate like portion being integral with a base portion extending throughout the entire area of the part of the cylinder to be cooled, and which base portion is common to all of said plate like portions, and is flexible, said base portion having spacing lugs integral therewith and extending from the face thereof opposite said plate-like portions.

In testimony whereof I hereto affix my signature.

JAMES M. H. JACOBS.